United States Patent [19]

Burgers et al.

[11] Patent Number: 5,288,200
[45] Date of Patent: Feb. 22, 1994

[54] BOTTLED WATER INSTALLER

[75] Inventors: Willy Burgers, Laguna Niguel; Rabih Nassif, Corona, both of Calif.

[73] Assignee: Laguna Machine, Inc., Laguna Hills, Calif.

[21] Appl. No.: 977,916

[22] Filed: Nov. 18, 1992

[51] Int. Cl.$^5$ ............................................. B65G 65/23
[52] U.S. Cl. .................................. 414/758; 187/35; 414/422; 414/782
[58] Field of Search .................... 187/32, 35, 9 R; 141/319; 222/505; 414/422, 758, 782, 773

[56] References Cited

U.S. PATENT DOCUMENTS

| | | |
|---|---|---|
| 2,019,034 | 10/1935 | Alex . |
| 2,139,208 | 12/1938 | Rindl et al. . |
| 2,319,739 | 5/1943 | Kessler . |
| 2,788,135 | 4/1957 | Girotti . |
| 3,261,486 | 7/1966 | Oliver ................................ 414/422 |
| 3,868,033 | 2/1975 | LeDuff . |
| 4,036,382 | 7/1977 | Perry et al. . |
| 4,797,050 | 1/1989 | Habicht ............................. 414/420 |
| 5,170,863 | 12/1992 | Devvoy ............................. 187/9 R |

FOREIGN PATENT DOCUMENTS 2-215689 8/1990 Japan ................................. 414/422

Primary Examiner—Michael S. Huppert
Assistant Examiner—Janice Krizek
Attorney, Agent, or Firm—Gordon L. Peterson

[57] ABSTRACT

An installer comprising a supporting structure and a carriage adapted to carry a water bottle. The carriage is mounted on the supporting structure for movement along a path between a loading position in which the carriage is adapted to receive the water bottle and an unloading position in which the carriage is at a higher elevation than in the loading position and inverted with respect to the loading position. A stopper is mounted on the carriage for movement with the carriage between the loading and unloading positions. The stopper is movable between a closed position in which it essentially closes a mouth of the water bottle and an open position in which the stopper is displaced from the closed position. A cam system is carried by the supporting structure and is responsive to the carriage approaching the unloading position for moving the stopper from the closed position to the open position.

18 Claims, 7 Drawing Sheets

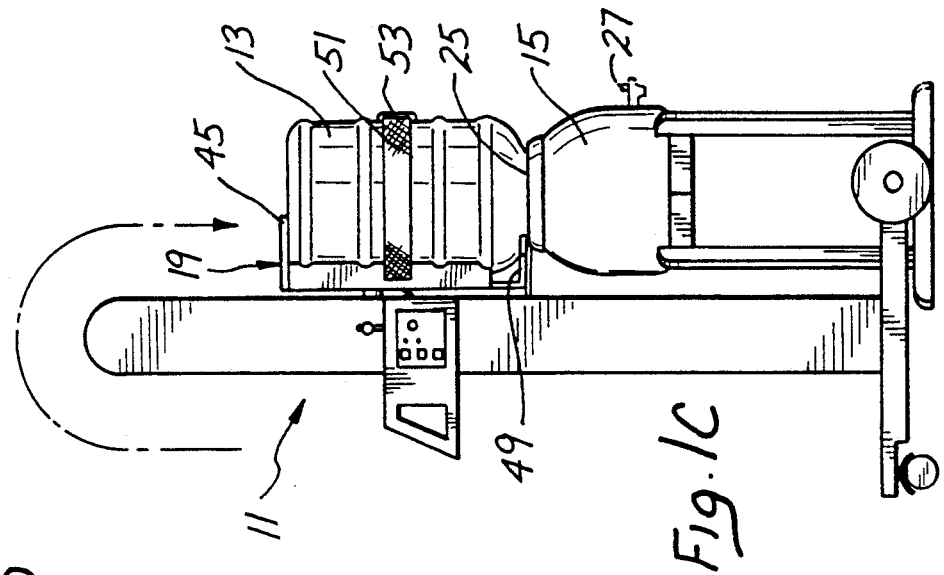
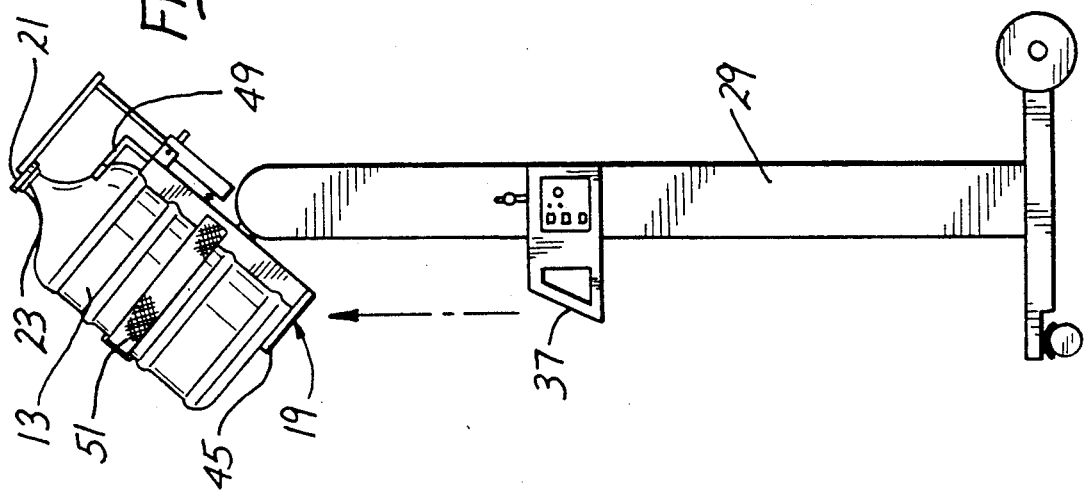
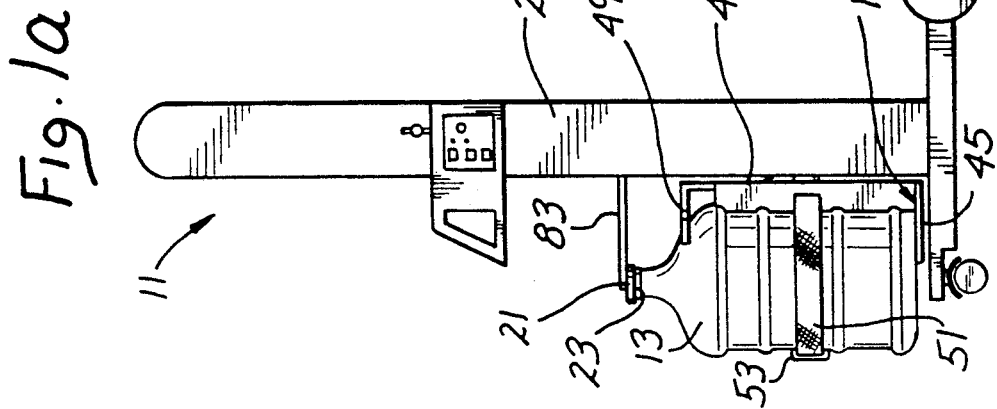

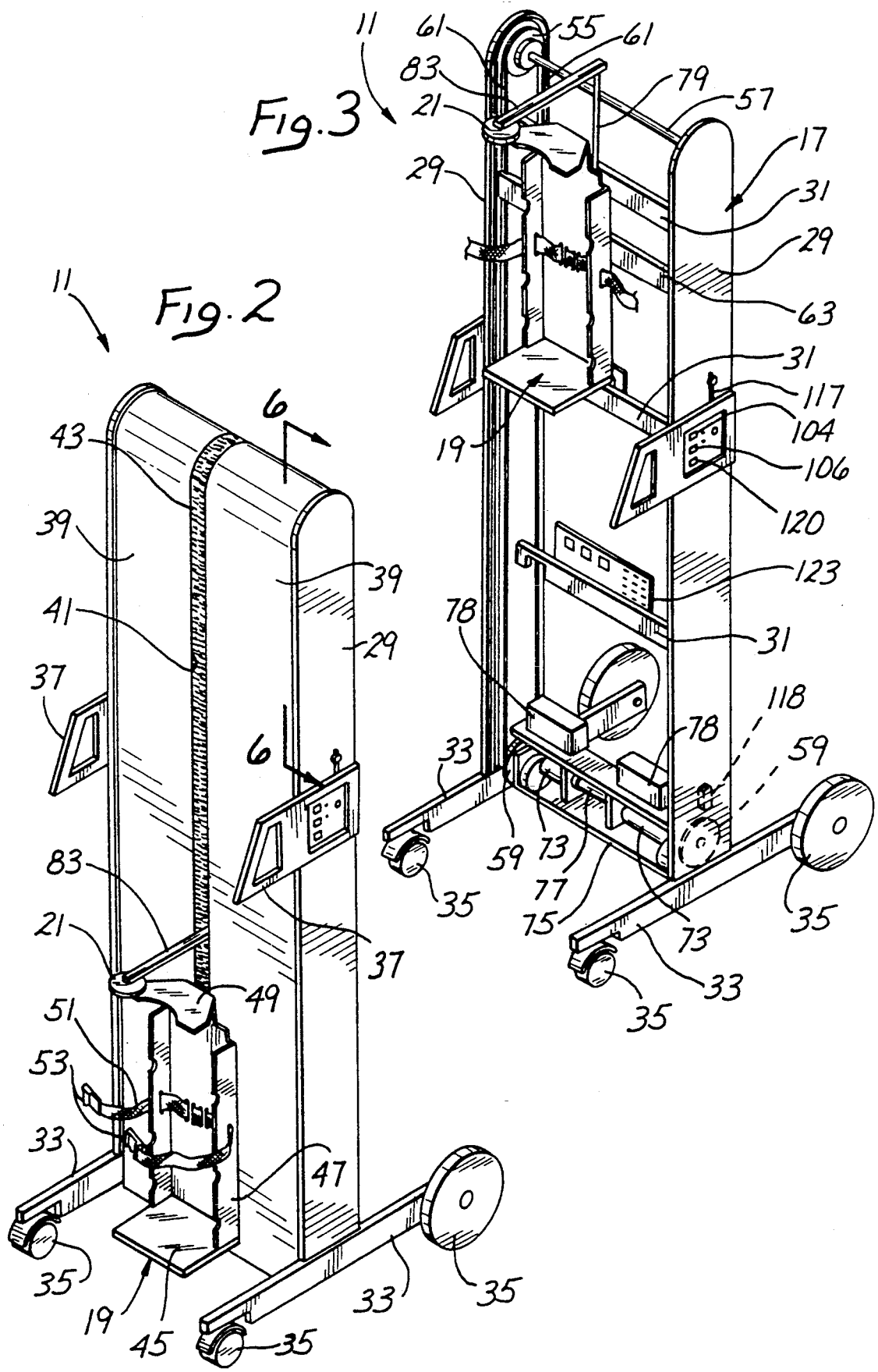

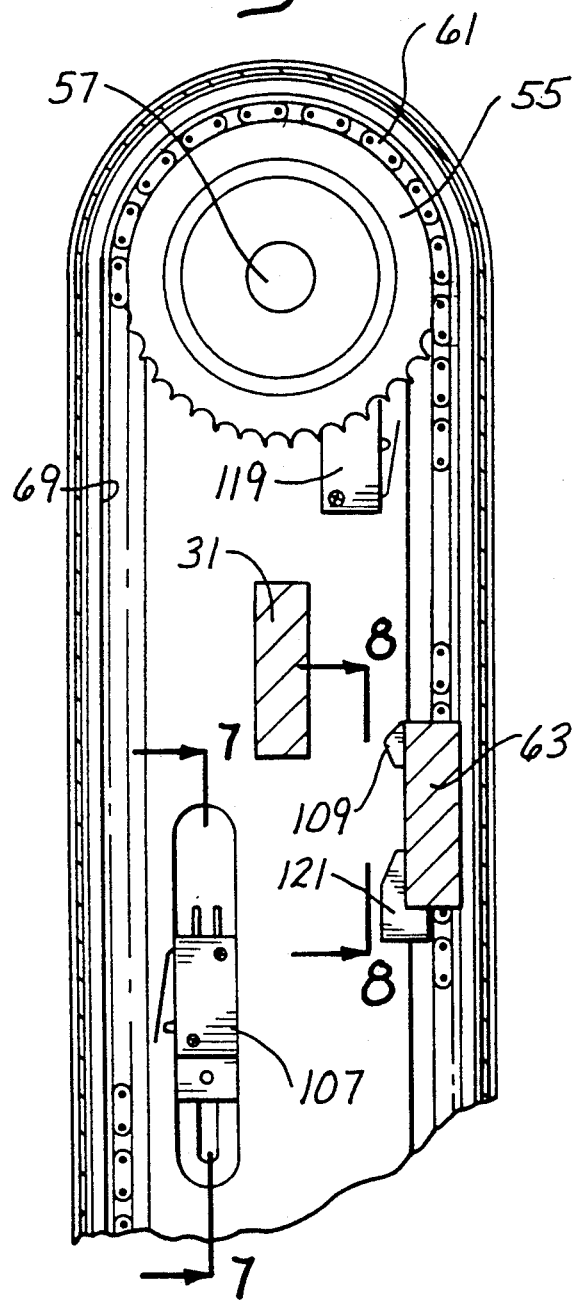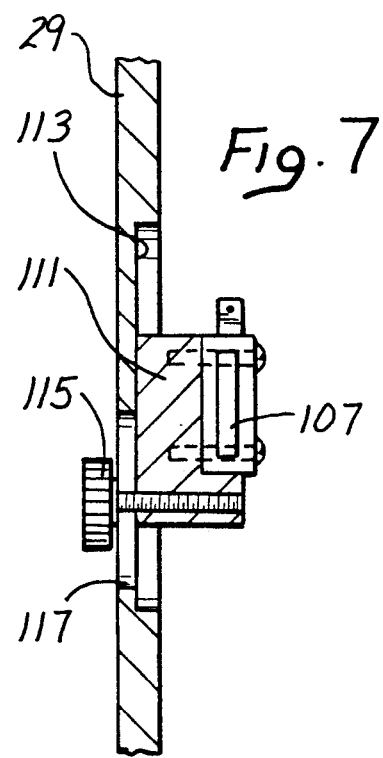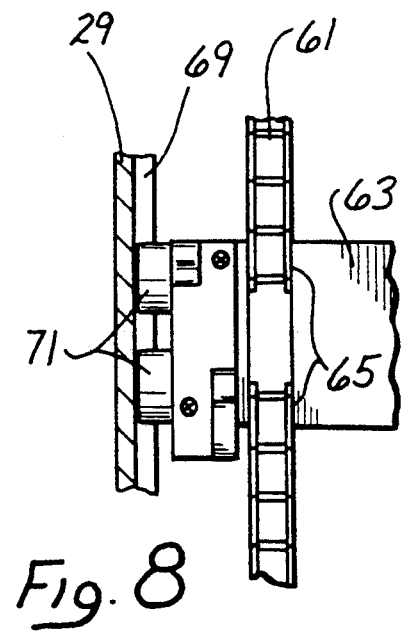

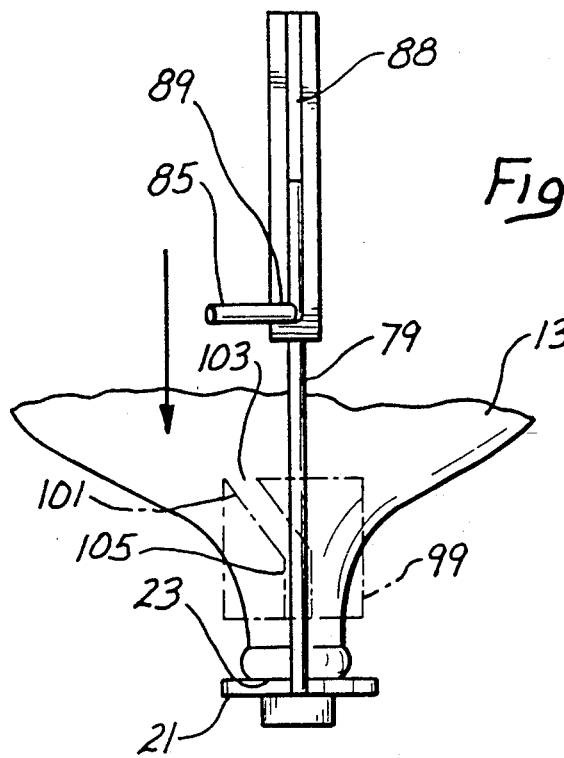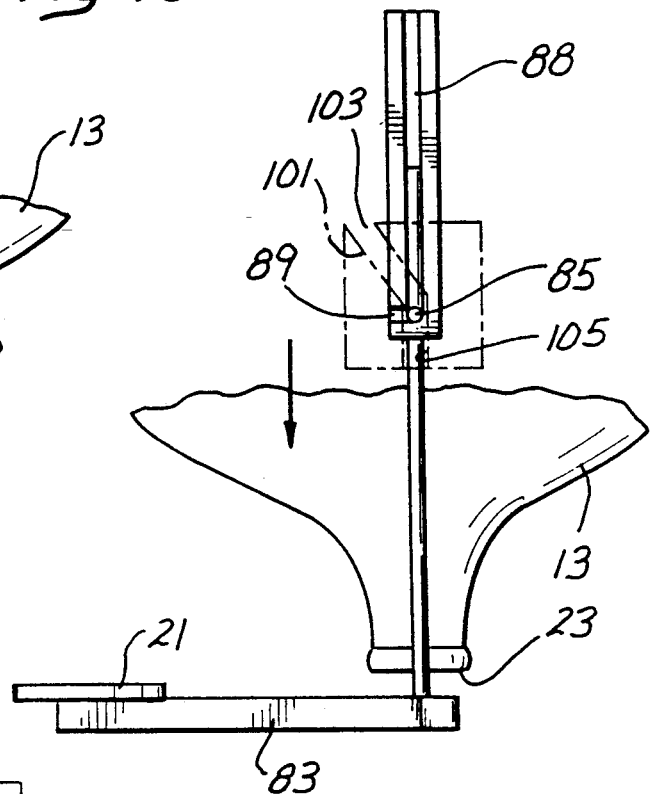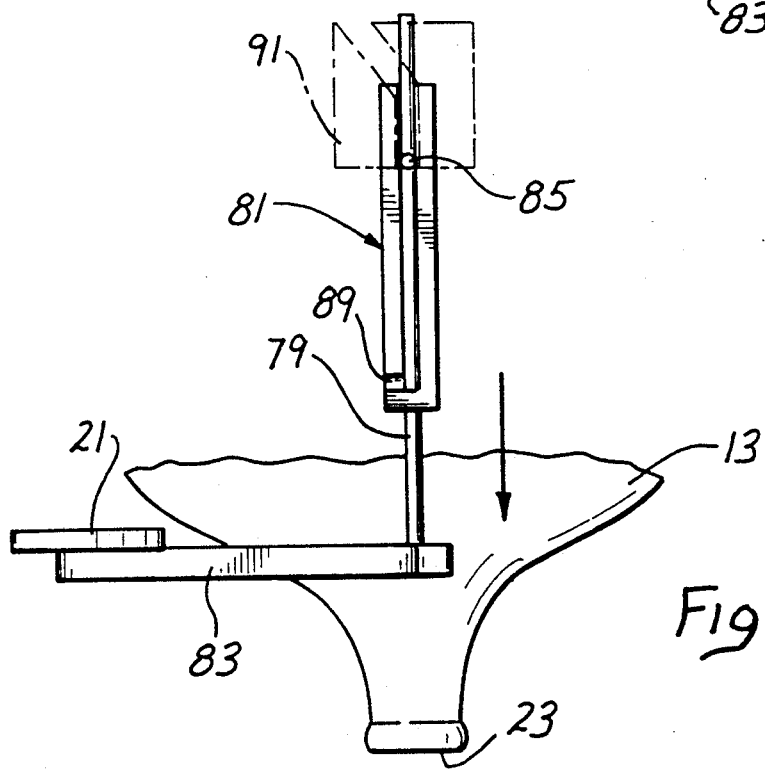

BOTTLED WATER INSTALLER

BACKGROUND OF THE INVENTION

It is sometimes necessary to install a container of flowable material on a dispenser. A common example is installing a water bottle on top of a water dispenser.

Water bottles of this type are typically relatively large and have a removable cap over the mouth of the bottle. To install the water bottle on the dispenser, the cap is removed, and the water bottle is manually lifted off of the floor, inverted and placed onto the top of the dispenser.

Because the weight of the bottle when filled with water is substantial, this task is difficult to perform and cannot be carried out by some people. The need to invert the bottle when placing it onto the dispenser also makes this task more difficult to accomplish without spilling water from the bottle.

It is known to provide a mechanical apparatus as shown, for example, in Perry et al U.S. Pat. No. 4,036,382 to aid in the installation of a water bottle onto a dispenser. Although this prior art device facilitates the lifting and inversion of the water bottle, it contains no provision to prevent spilling of water from the bottle once it is inverted. Consequently, the cap for the water bottle must be left on until after the bottle is inverted whereupon the installation process must be stopped to allow removal of the cap.

SUMMARY OF THE INVENTION

This invention provides an installer which facilitates the installation of a water bottle onto a water dispenser. Spillage of water from the bottle is substantially eliminated and there is no need to interrupt the installation process so that the cap from the water bottle can be removed. Although this invention is described with respect to a water bottle and a water dispenser, it should be understood that many of its features are applicable more broadly to an installer for installing a container of flowable material on a dispenser or other device.

An installer constructed in accordance with the teachings of this invention may include a supporting structure and a carriage adapted to carry a container of flowable material. The carriage is mounted on the supporting structure for movement along a path between a loading position in which the carriage is adapted to receive the container and an unloading position in which the carriage is at a higher elevation than in the loading position and is inverted with respect to the loading position.

A stopper is mounted on the supporting structure for movement with the carriage between the loading and unloading positions. The stopper is movable between a closed position in which the stopper can essentially close a mouth of the container and an open position in which the stopper is displaced from the closed position. Thus, in the closed position, the stopper essentially prevents flow of the flowable material out of mouth of the container even when the container is inverted.

The stopper can advantageously be automatically moved from the closed position to the open position as the carriage approaches the unloading position. This is preferably accomplished by a cam system carried by the supporting structure with the cam system being responsive to the carriage approaching the unloading position for moving the stopper from the closed position to the open position.

Although the cam system can be of various different constructions, preferably it includes a cam mounted on the supporting structure and a cam follower coupled to the stopper. The cam follower engages the cam as the carriage approaches the unloading position. Both the stopper and the cam follower are preferably carried by the carriage.

In a preferred construction, the installer includes a bearing on the carrier, a shaft coupled to the stopper and rotatably received in the bearing. The cam follower is coupled to the shaft and projects laterally of the shaft so that engagement of the cam follower and the cam as the carriage approaches the unloading position rotates the shaft to move the stopper to the open position.

A resilient member can be used to urge the stopper toward the mouth of the container in order to more tightly close off the mouth of the container. In a preferred construction, the bearing is mounted on the carriage for pivotal movement about a pivot axis and a resilient member biases the bearing in a direction about the pivot axis to accomplish tighter closure of the mouth of the container by the stopper.

Although the carriage can be moved from the loading position to the unloading position manually with an appropriate mechanism which provides mechanical advantage, preferably this is carried out with motor means which may include one or more electrical motors. Although the motor means can be controlled manually, preferably a combination of manual and automatic controls are utilized. For example, the motor may be started manually to move the carriage from the loading to the unloading position and from the unloading to the loading position. The motor may be stopped or the drive train between the motor and the carriage disengaged at the loading and unloading position. This can advantageously be accomplished by a stop switch and a stop switch actuator engageable with the stop switch to stop the motor means. The location of at least one of the stop switch and the stop switch actuator is preferably adjustable to permit adjusting the location of the unloading position. This is useful in accommodating dispensers of different heights.

This invention also programs the speed of travel of the carriage, and hence of the container carried by the carriage to achieve rapid loading and to minimize risk of spillage and of creating undesirable forces from movement of the heavy container. According to a preferred program, the carriage moves relatively rapidly from the loading position to a location near an inverting region which is intermediate the loading and unloading positions of the carriage and in which the carriage inverts. Near the inverting region, the speed at which the motor means drives the carriage is reduced so that the carriage is driven at a reduced speed through at least a major portion of the inverting region. Preferably, this reduced speed is also used until the unloading position is reached. This reduces centrifugal forces resulting from inversion of the water bottle and also provides a slower speed for actuation of the cam system.

In a preferred construction, this accomplished by a switch which is carried by one of the carriage and the supporting structure and a switch actuator which is carried by the other of the carriage and the supporting structure. The switch actuator is engageable with the switch near the inverting region and between the loading position and the inverting region to actuate the switch. Actuation of the switch brings about reduction of speed of the carriage by, for example, reducing the speed of the motor and/or actuating a transmission such as a gear reducer to reduce the speed of movement of the carriage.

The supporting structure may be of any desired construction and may include, for example, upright frame members coupled together with transverse frame members. Although the installer can be driven with various different drives, a chain drive mounted on the supporting structure between the upright frame members is preferred. In a preferred construction, a mounting member is coupled to the chain drive and to the carriage so that the motor can drive the carriage through the chain drive. Wheels are preferably provided on the supporting structure to facilitate movement of the supporting structure, and suitable means is provided on the carriage for releasably attaching a water bottle to the carriage.

The invention, together with additional features and advantages thereof may best be understood by reference to the following description taken in connection with the accompanying illustrative drawings.

BRIEF DESCRIPTION OF THE DRAWINGS

FIGS. 1a-1c are side elevational views of a water bottle installer with the water bottle in the loading position (FIG. 1a), in the inverting region (FIG. 1b) and in the unloading position (FIG. 1c).

FIG. 2 is a perspective view of the water bottle installer with the carriage in the loading position.

FIG. 3 is a perspective view similar to FIG. 2 with the housing removed and the carriage elevated above the loading position.

FIG. 6 is an enlarged fragmentary sectional view taken generally along line 6—6 of FIG. 2.

FIG. 7 is an enlarged fragmentary sectional view taken generally along line 7—7 of FIG. 6 and illustrating a preferred way to adjust the location of the stop switch for the unloading position.

FIG. 8 is an enlarged fragmentary sectional view taken generally along line 8—8 of FIG. 6.

FIGS. 10-12 are somewhat schematic elevational views illustrating the operation of the cam and cam follower in moving the stopper f rom the closed position of FIG. 10 to the open position of FIGS. 11 and 12.

DESCRIPTION OF THE PREFERRED EMBODIMENT

Figure 4:
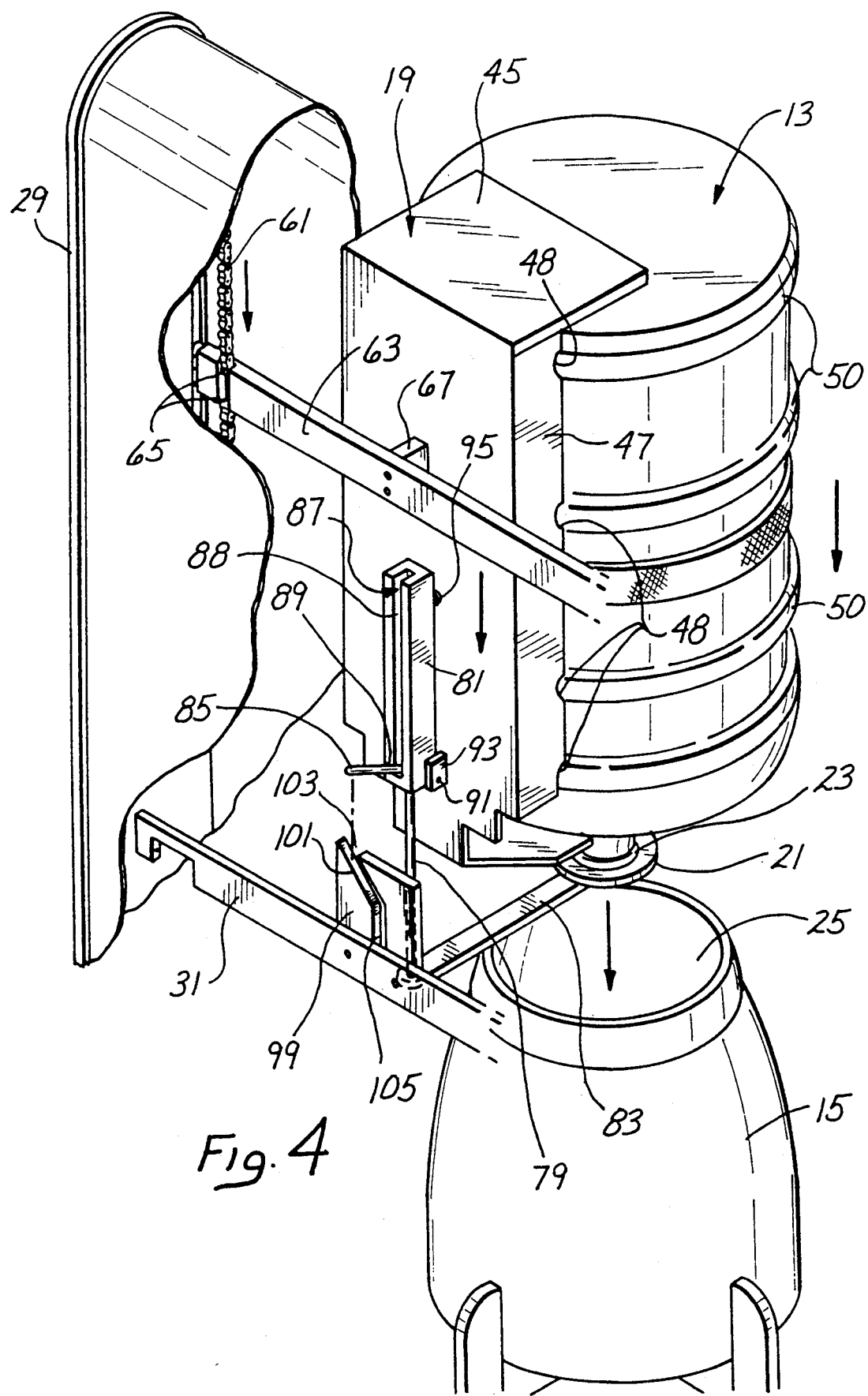
FIG. 4 is a fragmentary perspective view with portions of the housing broken away and with the water bottle inverted and nearing the unloading position.

FIGS. 1-3 show a water bottle installer 11 for installing a water bottle 13 on a water dispenser 15 (FIG. 1c). The installer 11 generally includes a supporting structure 17, a carriage 19 and a stopper 21 mounted on the carriage. The carriage 19 is mounted on the supporting structure 17 for movement along a path between a loading position (FIG. 1a) through an inverting region (FIG. 1b) to an unloading position (FIG. 1c). In the loading position, the carriage 19 is at its lowest elevation near the supporting surface on which the installer 11 rests so that the water bottle 13 can be easily lifted onto the carriage. In the inverting region (FIG. 1b) of the path, the carriage 19 and the water bottle 13 are inverted, and in the unloading position the carriage and water bottle are at a higher elevation than in the loading position and inverted with respect to the loading position.

The stopper 21 closes a mouth 23 of the water bottle 13 in the positions of FIGS 1a and 1b. The stopper 21 is automatically moved from this closed position in which the mouth 23 is essentially closed by the stopper to an open position in which the stopper is displaced from the closed position in response to the carriage 19 approaching the unloading position (FIG. 1c).

The water bottle 13 may be a conventional polymeric bottle having a removable cap (not shown) for closing the mouth 23 during transportation and storage of the water bottle. Likewise, the dispenser 15 may be a conventional dispenser having an open top 25 (FIGS. 1c and 4) to receive a portion of the water bottle 13 and a conventional normally closed manual valve 27 which can be manually opened to allow gravity flow of the water from the water bottle 13 out through the valve.

Although the supporting structure 17 can be of various different constructions, in the embodiment illustrated, it includes spaced, elongated, plate-like, upright frame members 29 (FIGS. 3 and 5) and transverse members 31 extending between and coupled to the upright frame members. The supporting structure 17 also includes rails 33 coupled to the bottom of the upright frame members 29 and wheels 35 rotatably mounted on the rails. Handles 37 are attached to the upright frame members 29 to facilitate manual movement of the installer 11 and U-shaped housing sections 39 (FIG. 2) are suitably removably coupled to the upright frame members 29. The housing sections 39 are spaced apart centrally of the supporting structure 17 to define an elongated slot 41. The slot 41 may be covered by brush-like material 43 which does not impede movement of the stopper 21 along the slot 41.

The carriage 19 may be of any construction suitable for releasably carrying the water bottle 13. In this embodiment, the carriage 19 includes a base 45 (FIG. 2) on which the water bottle 13 can rest in the loading position, an upright or peripheral wall 47 extending upwardly from the base and an upper or retaining wall 49. If desired, the peripheral wall 47 may have grooves 48 (FIG. 4) to mate with annular ridges 50 of the water bottle 13.

Any suitable means can be provided on the carriage 19 for releasably attaching the water bottle 13 to the carriage. Although such means could include a variety of constructions including hinged doors or gates, in this embodiment it includes an elongated flexible member in the form of a belt 51 extending through the peripheral wall 47 and having a buckle 53, which is preferably of a quick disconnect type, for releasably attaching the opposite ends of the belt 51 together around a central region of the water bottle 13 to securely retain the water bottle on the base 45 and in close proximity to the retaining wall 49.

To move the carriage 19 along the path, the installer 11 includes an appropriate drive mechanism which, in the embodiment, is a chain drive. More specifically, the chain drive includes upper sprockets 55 (FIGS. 3 and 6) mounted for rotation on an upper axle 57 which extends between the upright frame members 29, lower sprockets 59, and chains 61 extending between the upper and lower sprockets along the inside of the upright frame members 29, respectively. A mounting member 63 (FIGS. 3, 4, 6 and 8) is coupled to the chain drive and to the carriage 19 so that the chain drive can drive the carriage. Preferably this is accomplished as shown in FIG. 8 by employing discontinuous chains 61 having spaced apart ends 65 which are suitably coupled to the mounting member 63. A central region of the mounting member 63 is coupled by suitable fasteners and a block 67 (FIG. 4) to the peripheral wall 47 of the carriage 19. The block 67 extends through the slot 41 (FIG. 2) as the carriage 19 is moved along the path.

To guide the movement of the mounting member 63, each of the upright frame members 29 has a track 69 (FIG. 8) extending along its inner face and rollers 71 are rotatably coupled to the opposite ends of the mounting member 63 and ride in the associated track 69. The construction shown in FIG. 8 is repeated at the other end of the mounting member 63.

The chain drive is suitably driven by motor means which, in this embodiment, includes two motors 73 (FIG. 3) mounted on a frame 75 at the lower end of the supporting structure 17 and suitably coupled together by a rigid coupling 77 and iq-the lower sprockets 59. Preferably, each of the motors 73 is a 12 volt dc motor which includes a speed reducer and in this embodiment these motors provide speed reduction of 487.8 to 1. of course, speed reducers which are separate from the motors 73 can be employed, if desired. The rigid coupling 77 causes the motors 73 to rotate at the same RPM and the substantial speed reduction provides increased torque for lifting of the water bottle 13 and reduces or eliminates the back driving of the motors by the water bottle during its descent toward the unloading position. Two batteries 78 are suitably mounted on the supporting structure 17 above the motors 73 for providing electrical energy to drive the motors.

Figure 5:
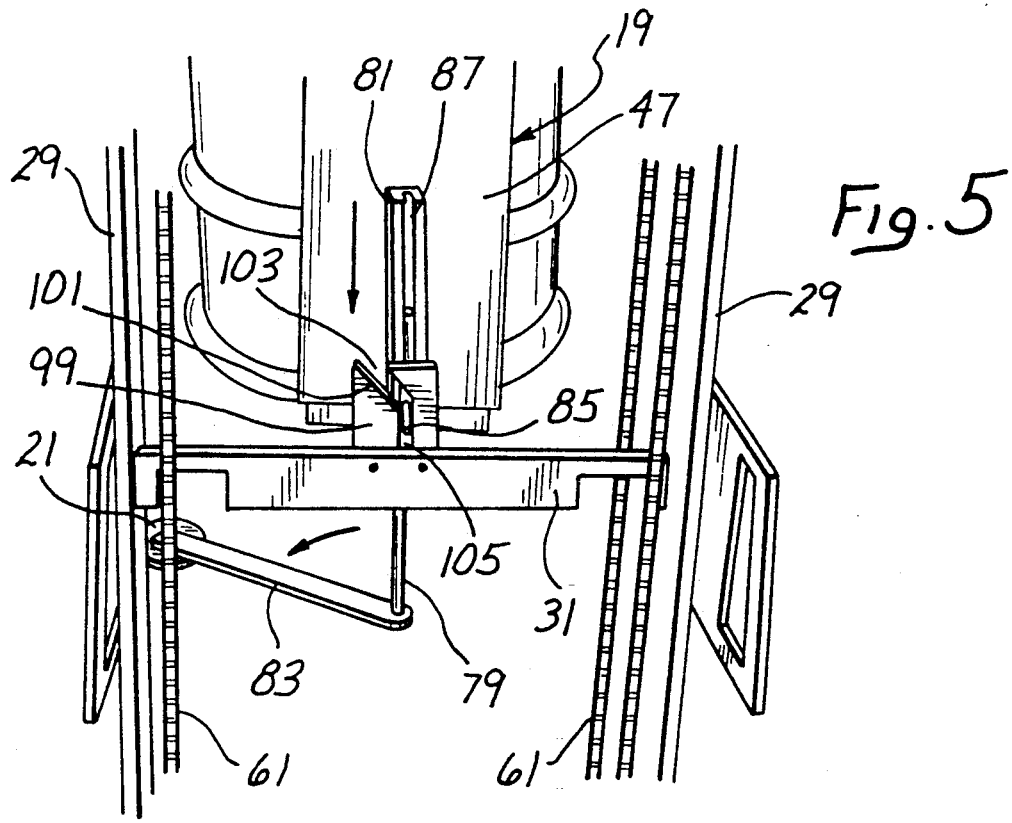
FIG. 5 is a fragmentary perspective view illustrating the water bottle in the unloading position.

The stopper 21 is mounted for movement between a closed position (FIG. 4) and an open position (FIG. 5). In this embodiment, the stopper 21 is displaced laterally from the closed position to the open position. More specifically, the stopper 21 is mounted for pivotal movement between its positions by a shaft 79 which is rotatably received in a bearing 81 suitably mounted on the peripheral wall 47 of the carriage 19. The stopper 21 is coupled to the shaft 79 by an arm 83 which projects through the slot 41 (FIG. 2). A cam follower 85 in the form of rod is coupled to the shaft 79 and projects radially of the shaft.

More specifically, the bearing 81 receives the shaft 79 in a slot 87 which has an elongated axial section 88 and a short lateral section 89 (FIG. 4) intersects the elongated (antecedent) lateral section 87. In the closed position of FIG. 4, the cam follower 85 is in the lateral section 89.

Figure 9:
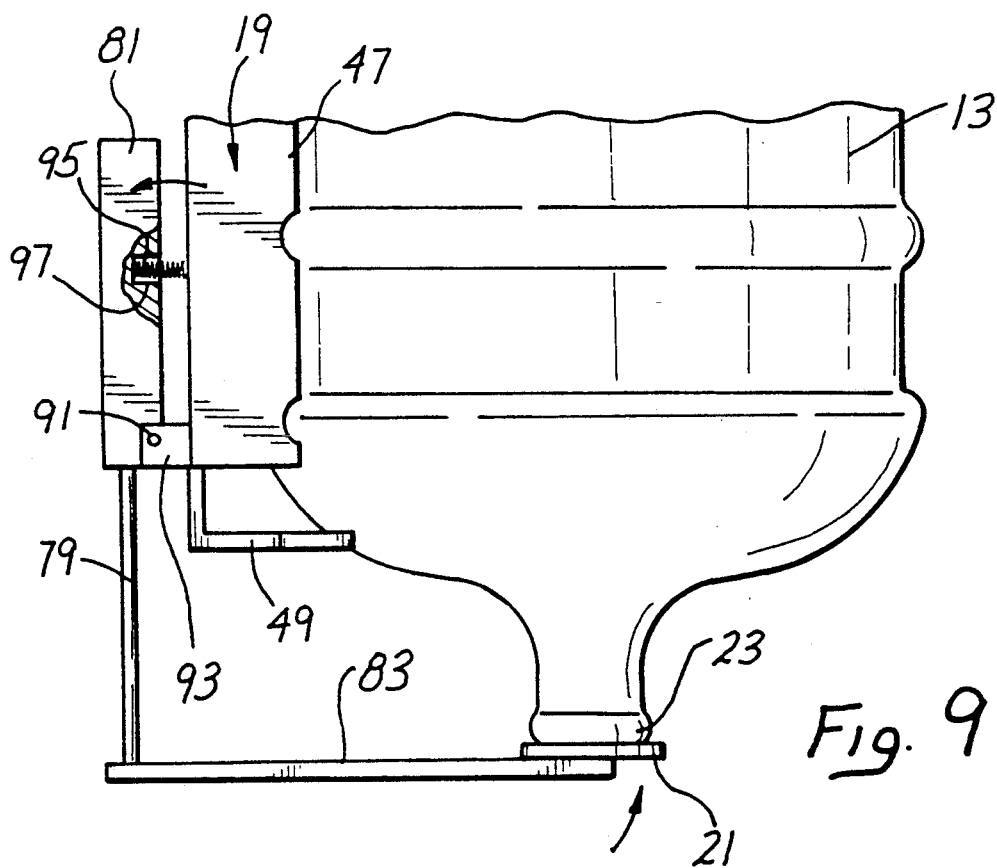
FIG. 9 is a fragmentary side elevational view with the water bottle inverted and with the stopper in the closed position.

To make the stopper 21 more effective, a resilient member urges the stopper toward the mouth 23 of the water bottle 13. This is preferably accomplished by mounting the bearing 81 for pivotal movement on the carriage 19 in any suitable manner such as by a pin 91 (FIG. 9) and a bracket 93 and employing a spring 95 in a socket 97 of the bearing 81 to act between the bearing and the carriage. This exerts a counterclockwise couple (as viewed in FIG. 9) on the bearing 81, the shaft 79, the arm 83 and the stopper 21 thereby resiliently forcing the stopper 21 against the mouth 23 of the water bottle 13.

This invention employs a cam system carried by the supporting structure 17 responsive to the carriage 19 approaching the unloading position (FIG. 1c) for moving the stopper 21 from the closed position (FIGS. 4 and 10) to the open position (FIGS. 5, 11 and 12). The cam system includes a cam 99 (FIGS. 4 and 5) mounted on one of the transverse frame members and the cam follower 85 which is coupled to the stopper 21. The cam 99 has a cam track which includes an inclined slot 101 opening at a mouth 103 and an axial slot 105 joined to the inclined slot 101. The cam 99, which may be in the form of a plate, is positioned on the transverse frame member 31 such that the mouth 103 is aligned with the cam follower when the stopper 21 is in the closed position of FIG. 4.

As the carriage 19 descends, the cam follower 85 passes through the mouth 103 into the inclined slot 101 of the cam track and is pivoted to pivot the stopper 21 to the unloading position of FIGS. 5 and 11. This all occurs as the carriage approaches the unloading position of FIG. 1c and with the mouth 23 closely adjacent the open top 25 of the dispenser 15. Consequently, the likelihood of water spilling out of the water bottle 13 is greatly reduced.

As the water bottle 13 continues its descent toward the unloading position, the cam follower 85 eventually reaches the bottom of the axial slot 105 whereupon further downward movement of the cam follower 85, the shaft 79, the arm 83 and the stopper 21 is arrested. However, the water bottle 13 and associated components of the installer including the bearing 81 continue their descent to the unloading position as shown in FIG. 12. Because the shaft 79 and the cam follower 85 can slide in the axial section 88 of the slot 87, this relative movement is allowed to occur.

Figure 13:
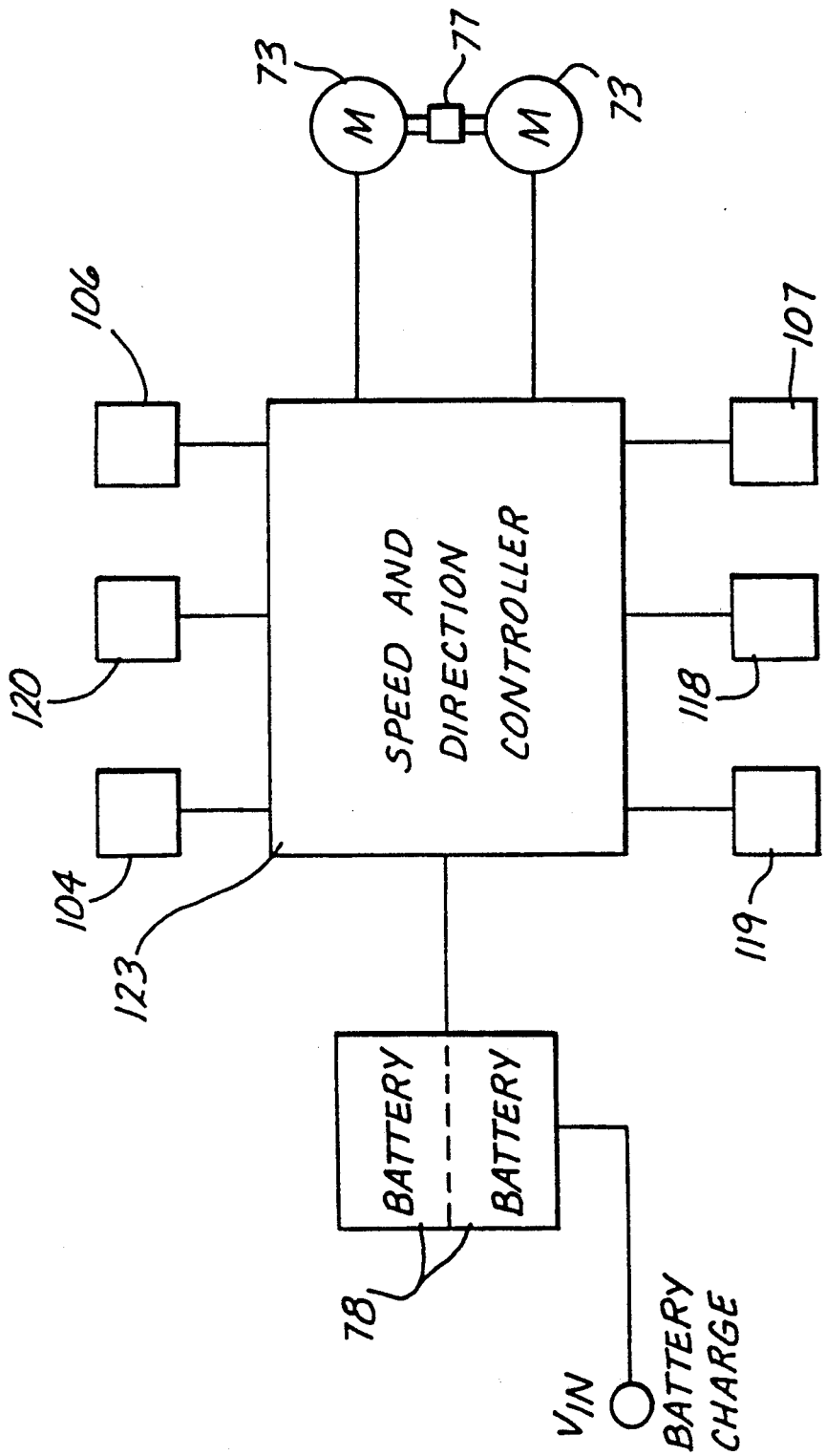
FIG. 13 is a block diagram illustrating one way to control the movements of the carriage between the loading and unloading position.

The motors 73 may be manually controlled, if desired. Preferably however the motors 73 are started manually in the loading position by an up switch 104 (FIGS. 3 and 13) and automatically shut off at the unloading position. Conversely, the motors are manually started in the loading position by a return switch 106 (FIGS. 3 and 13) and automatically shut off after the carriage 19 returns to the loading position. The shutoff can be accomplished at the unloading position with an unloading stop switch 107 (FIGS. 6 and 13). The stop switch 107 is actuated by a stop switch actuator 109 carried by the back side of the mounting member 63 (FIG. 6). Thus, in the unloading position, the stop switch actuator 109 engages the stop switch 107 to stop the motors 73 and hence the carriage 19 and water bottle 13 in the unloading position.

In this embodiment, the location of the stop switch 107 is adjustable to thereby adjust the location of the unloading position. This can be accomplished, for example, as shown in FIG. 7 in which the stop switch 107 is mounted on a mounting block 111 which is slidable in a groove 113 of one of the upright frame members 29. A locking screw 115 extends through a longitudinal slot 117 in the upright frame member 29. By tightening the screw 115, the head of the screw bears against the upright frame member 29 on the opposite sides of the slot 117 to fix the mounting block 111 and the switch 107 in position. The location of the stop switch 107 can be changed by loosening of the screw 115 and sliding the block 111 to a new position whereupon the screw 115 can again be tightened.

To return the carriage 19 to the loading position, the down switch 106 is manually depressed to energize the motors 73 to drive the carriage back to the loading position. On the return trip the cam 99 cams the cam follower 85 and the stopper 21 back to the position of FIG. 10. A loading stop switch 118 (FIGS. 3 and 13), which may be identical to the unloading stop switch 107 and also actuated by the actuator 109, automatically de-energizes the motors 73 in the loading position. The switch 118 may also be mounted on one of the upright frame members 29 as shown in FIG. 3. A manual shutoff switch 120 (FIGS. 3 and 13) can be manually actuated at any time to de-energize the motors 73 to halt movement of the carriage 19. Of course, the switches could be carried by the mounting member 63 and the switch actuators could be fixedly mounted on the upright frame member 29, if desired.

The motors 73 may run at constant speed, if desired, to drive the carriage 19 at a constant velocity from between the loading and unloading positions. According to one desirable, but optional feature of the invention, the speed at which the motors 73 drive the carriage 19 is reduced through the inverting region of the carriage path, i.e. the region of the path during which the carriage 19 and the water bottle 13 are undergoing angular movement. Although this can be accomplished in any suitable manner, it is preferably accomplished by a speed reduction switch 119 (FIGS. 6 and 13) mounted on one of the upright frame members 29 and a switch actuator 121 carried by the mounting member 63 and engageable with the switch 119 just prior to the time that the carriage 19 enters the inverting region of the carriage path. In this embodiment, the carriage 19 is thereafter driven at the reduced speed all the way to the unloading position. However, on the return trip from the unloading to the loading positions, the carriage may travel at a uniform relatively higher velocity.

The motors 73 can be controlled in a conventional manner by a suitable electronic speed and direction controller 123 (FIG. 13) which may be mounted on one of the transverse frame members 31 (FIG. 3). The controller 123 receives input from the switches 104,, 106, 107 and 118–120 and controls the motors 73 in response to these signals. For example, the speed and direction controller 123 couples the batteries 78 to the motors 73 in one polarity to drive the motors 73 in one direction and in the opposite polarity to drive the motors in the opposite direction. The speed and direction controller 123 couples the batteries 78 in series to drive the motors 73 at a relatively fast speed and couples the batteries in parallel to drive the motors 73 at the reduced speed. In the reduced speed mode the voltage input to the motors 73 is reduced from 24 volts to 12 volts dc.

In use of the installer 11, a water bottle 13 is manually loaded onto the carriage 19 in the loading position of FIG. 1 and the bottle is retained on the carriage by buckling of the buckle 53. The installer 11 is next wheeled to a position adjacent the dispenser 15 (FIG. 1c) and the up switch 104 is manually actuated to start the motors 73. This drives the carriage 19 through the chain drive at a relatively high speed until the switch actuator 121 contacts the speed reduction switch 119 to slow down the motors 73 just prior to the carriage 19 entering the inverting region. This slow speed is maintained all the way to the unloading position of FIG. 1c. As the unloading position is approached, the cam follower 85 enters the slot 101 and is cammed to the position of FIG. 5 in which the stopper 21 is pivoted away from the mouth 23 as shown in FIGS. 5 and 10–12 to allow water from the bottle to be discharged into the dispenser 15 through the open top 25 of the dispenser. With the water bottle 13 deposited on the dispenser 15, the buckle 53 is released, the installer 11 pulled away from the dispenser and the down or return switch is manually actuated to energize the motors 73 to drive the carriage 19 back to the loading position.

Although an exemplary embodiment of the invention has been shown and described, many changes, modifications and substitutions may be made by one having ordinary skill in the art without necessarily departing from the spirit and scope of this invention.

What is claimed is:

1. An installer for installing a container of flowable material on a dispenser, said installer comprising:
   a supporting structure;
   a carriage adapted to carry the container, said carriage being mounted on the supporting structure for movement along a path between a loading position in which the carriage is adapted to receive the container and an unloading position in which the carriage is at a higher elevation than in the loading position and inverted with respect to the orientation of the carriage in the loading position;
   a stopper mounted on the supporting structure for movement with the carriage between the loading and unloading positions, said stopper being movable between a closed position in which the stopper can essentially close a mouth of the container and an open position in which the stopper is displaced from the closed position; and
   a cam system carried by the supporting structure responsive to the carriage approaching the unloading position for moving the stopper from the closed position to the open position.

2. An installer as defined in claim 1 wherein the cam system includes a cam mounted on the supporting structure and a cam follower coupled to the stopper, said cam follower engaging the cam as the carriage approaches the unloading position.

3. An installer as defined in claim 2 wherein the stopper and the cam follower are carried by the carriage.

4. An installer as defined in clam 2 including a bearing on the carriage, a shaft coupled to the stopper and rotatably received in the bearing, said cam follower being coupled to the shaft and projecting laterally of the shaft whereby engagement of the cam follower and cam as the carriage approaches the unloading position rotates the shaft to move the stopper to the open position.

5. An installer as defined in claim 4 wherein the bearing is mounted on the carriage for pivotal movement about a pivot axis and a resilient member biases the bearing in one direction about the pivot axis.

6. An installer as defined in claim 1 including a resilient member for urging the stopper toward the mouth of the container.

7. An installer as defined in claim 1 including motor means for moving the carriage from the loading position to the unloading position.

8. An installer as defined in claim 7 wherein said path has an inverting region intermediate said positions of the carriage in which the carriage inverts, said installer includes a switch carried by one of the carriage and the supporting structure and a switch actuator carried by the other of the carriage and the supporting structure, said switch actuator is engageable with the switch near said inverting region and between the loading position and said inverting region to actuate the switch, and means responsive to actuation of the switch to reduce the speed at which the motor means drives the carriage whereby the carriage is driven at a reduced speed through at least a major portion of the inverting region.

9. An installer as defined in claim 1 wherein the supporting structure includes spaced upright frame members and transverse frame members coupled to and extending between the upright frame members, the installer includes a chain drive mounted on the supporting structure between the upright frame members, motor means for driving the chain drive, a mounting member coupled to the chain drive and to the carriage whereby the motor means can drive the carriage through the chain drive.

10. An installer as defined in clam 9 including wheels on the supporting structure for moving the installer and means on the carriage for releasably attaching a water bottle to the carriage.

11. An installer for installing a container of flowable material on a dispenser, said installer comprising:
  a supporting structure;
  a carriage adapted to carry the container, said carriage being mounted on the supporting structure for movement along a path between a loading position in which the carriage is adapted to receive the container and an unloading position in which the carriage is at a higher elevation than in the loading position and inverted with respect to the orientation of the carriage in the loading position;
  motor means for moving the carriage from the loading position to the unloading position, said path having an inverting region intermediate said positions of the carriage in which the carriage inverts;
  a first switch carried by one of the carriage and the supporting structure;
  a first switch actuator carried by the other of the carriage and supporting structure and engageable with the switch near said inverting region and between the loading position and said inverting region to actuate the switch; and
  and first means responsive to actuation of the switch to reduce the speed at which the motor means drives the carriage whereby the carriage is driven at a reduced speed through at least a major portion of the inverting region.

12. An installer as defined in claim 11 including a stop switch and a stop switch actuator engageable in said unloading position to stop the motor means.

13. An installer as defined in claim 12 wherein the location of at least one of said stop switch and stop switch actuator is adjustable to adjust the location of the unloading position.

14. An installer as defined in claim 11 including a stopper mounted on the supporting structure for movement with the carriage between the loading and unloading positions, said stopper being movable between a closed position in which the stopper can essentially close an open upper end of the container and an open position in which the stopper is displaced from the closed position.

15. An installer as defined in claim 14 including a resilient member for urging the stopper toward a mouth of the container.

16. An installer as defined in claim 11 wherein the supporting structure includes spaced upright frame members and transverse frame members coupled to and extending between the upright frame members, the installer includes a chain drive mounted on the supporting structure between the upright frame members, said motor means being coupled to drive the chain drive, a mounting member coupled to the chain drive and to the carriage whereby the motor means can drive the carriage through the chain drive.

17. An installer as defined in claim 16 including wheels on the supporting structure for moving the installer and means on the carriage for releasably attaching a water bottle to the carriage.

18. An installer as defined in claim 11 including first and second batteries coupled in series for powering said motor means and said first means includes means for coupling the first and second batteries in parallel.

* * * * *